United States Patent [19]

Bosniac

[11] Patent Number: 5,088,283
[45] Date of Patent: Feb. 18, 1992

[54] VALVE DEVICE FOR ACTUATING THE TELESCOPIC CYLINDER OF A TIPPER

[75] Inventor: Deian Bosniac, Lohr/Main, Fed. Rep. of Germany

[73] Assignee: Mannesmann Rexroth GmbH, Lohr/Main, Fed. Rep. of Germany

[21] Appl. No.: 462,792

[22] Filed: Jan. 10, 1990

[30] Foreign Application Priority Data

Jan. 13, 1989 [DE] Fed. Rep. of Germany ....... 3900887

[51] Int. Cl.$^5$ .............................................. F16D 31/02
[52] U.S. Cl. ........................................ 60/468; 60/477; 60/480; 60/494; 91/461; 91/443
[58] Field of Search ................. 60/477, 480, 468, 494, 60/452; 91/461, 443, 169

[56] References Cited

U.S. PATENT DOCUMENTS

| 2,008,980 | 7/1935 | Gruber | 60/480 X |
|---|---|---|---|
| 2,362,713 | 11/1944 | Mott | 60/468 |
| 2,986,884 | 6/1961 | Smith | 60/468 X |
| 3,134,232 | 5/1964 | Barosko | 91/443 X |
| 3,170,377 | 2/1965 | Herpich et al. | 91/169 |
| 3,942,413 | 3/1976 | Schwary et al. | 60/468 |
| 3,945,457 | 3/1976 | Olsen | 60/468 X |
| 4,194,362 | 3/1980 | Nonnenmacher | 60/494 |
| 4,194,365 | 3/1980 | Stoufflet et al. | 60/468 |
| 4,199,942 | 4/1980 | Kasper | 60/452 X |
| 4,202,175 | 5/1980 | Hale et al. | 60/494 X |
| 4,287,911 | 9/1981 | Houdeshell | 91/443 X |
| 4,318,332 | 3/1982 | Shingu et al. | 91/443 X |
| 4,379,389 | 4/1983 | Liesener | 60/452 X |
| 4,382,631 | 5/1983 | Johnson | 91/443 X |
| 4,586,332 | 5/1986 | Schexnayder | 60/494 X |
| 4,835,966 | 6/1989 | Kanss et al. | 60/468 X |

Primary Examiner—Edward K. Look
Assistant Examiner—Todd Mattingly
Attorney, Agent, or Firm—Harness, Dickey & Pierce

[57] ABSTRACT

A proportional directional control valve in combination with a pressure compensator flow rate control valve opening towards a reservoir and a pressure unloading valve in the load- pressure- carrying control line for the compensator valve are provided to actuate the telescopic cylinder of a tipper truck. The valve device is connected to a pump of constant displacement. The operating speed of the telescopic cylinder is independent from the load to be lifted and the driving speed of the pump. Upon reaching a predetermined load pressure the pressure unloading valve is activated and the load pressure engaging the compensator valve towards closing direction is reduced via the reservoir such that the compensator valve opens and the pump displacement volume returns to the reservoir.

6 Claims, 1 Drawing Sheet

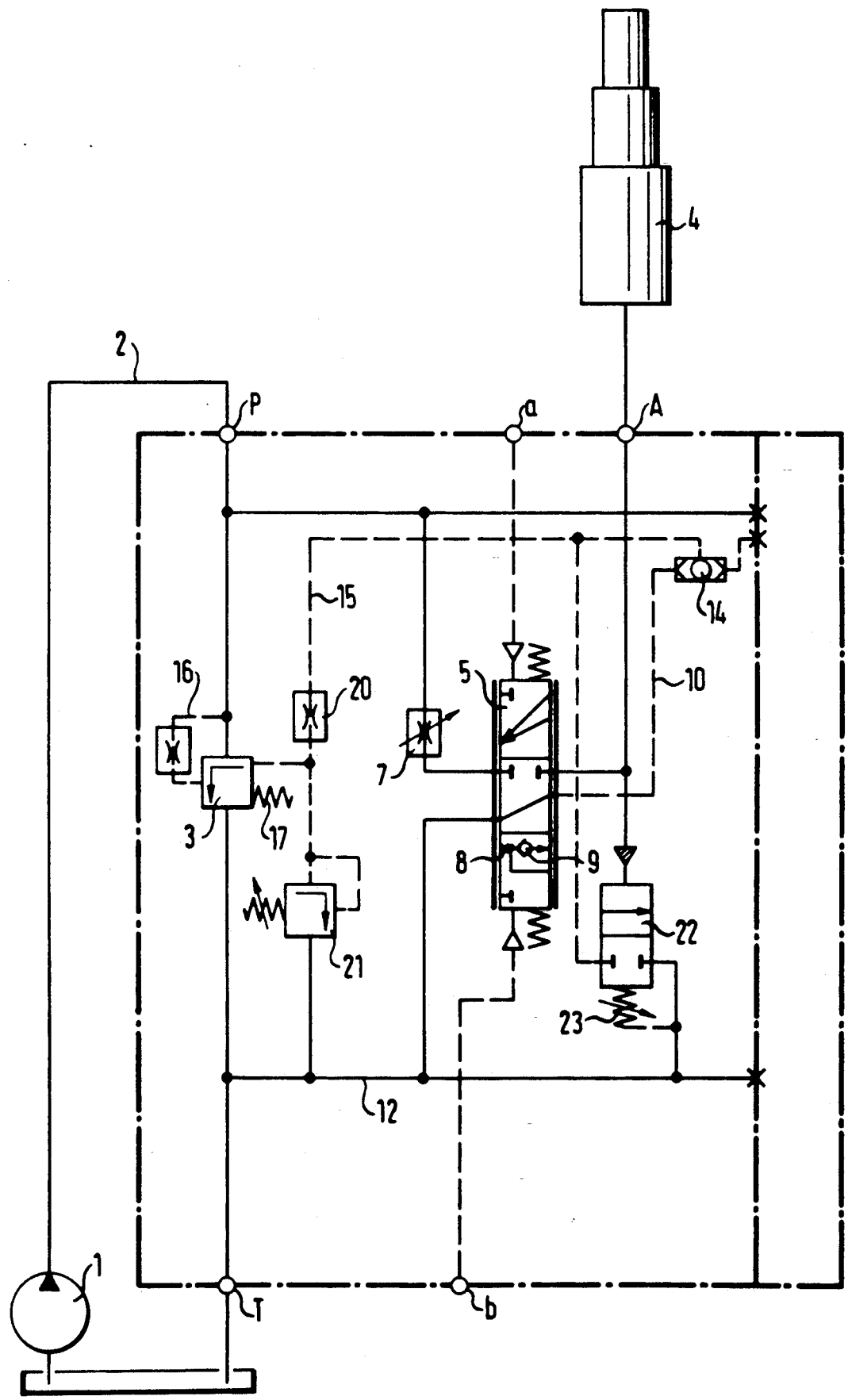

1

VALVE DEVICE FOR ACTUATING THE TELESCOPIC CYLINDER OF A TIPPER

BACKGROUND OF THE INVENTION

The hydraulic system for a tipper substantially comprises a pump of constant displacement volume which is driven by the truck engine thus delivering a flow of a speed responsive fluid volume, further a proportional directional control valve of the bypass type which is hydraulically or pneumatically controlled, a load holding valve for the telescopic cylinder which load holding valve is integral with the solenoid valve, a load-sided pressure unloading valve and a pump-sided pressure limiting valve.

The speed of a multiple stage telescopic cylinder for operating the dumper is controlled by the proportional adjustment of the directional valve while the truck engine is idling. The higher the load the smaller becomes the range of fine control as the prior system is load-dependent. When the load pressure reaches the level to which the pressure unloading valve is adjusted the volume displaced by the pump is returned to the reservoir via the pressure unloading valve which is located in the pump pressure line.

The speed of the telescopic cylinder may further be controlled by adjusting the pump displacement volume i.e. by adjusting the pump speed when the directional valve is fully open. However, there is a disadvantage because fluid volumes only can be controlled which are greater than the displacement volume of the pump while the engine is idling, in other words a fine control may be obtained between the minimum and the maximum displacement volume with the maximum speed only.

SUMMARY OF THE INVENTION

It is an object of the present invention to improve the valve device for actuating the telescopic cylinder of a tipper or dump. It is a further object to provide a control for the telescopic cylinder which is independent from the pump driving speed as well as independent from the load to be lifted.

The improvements achieved by the present invention are obtained by a valve system comprising a directional control valve connecting a telescopic cylinder to a pump of constant displacement volume or, respectively a reservoir, a load holding valve and a pressure unloading valve which is actuated by a predetermined pressure occurring in the telescopic cylinder to return the volume delivered by the pump to the reservoir, wherein the improvement includes a compensating valve to connect the pressure line from the pump to the directional control valve to the reservoir, the piston of said compensating valve engaged by the pump pressure towards the opening direction and by the load pressure and a spring towards closing direction.

According to the invention the pressure compensatied flow rate control valve located between the pump and the reservoir maintains the pressure drop across the throttling area of the directional valve constant. From this results that the fluid volume delivered to the load is a function of the opening area or, respectively the spool stroke of the directional valve only, in other words the fluid volume is independent from the load pressure and the speed of the pump. The respective pump delivery volume not used is returned to the reservoir via the pressure compensated valve at load pressure.

According to a further aspect of the present invention the load limiting mode or, respectively pressure unloading operation acts on the pressure compensated valve. From this results a smaller circulation resistance for the flow of fluid delivered by the pump when the maximum pressure allowed occurs in the telescopic cylinder. The valve device thus has reduced power losses.

According to a further aspect of the present invention the pressure release at the pressure compensated valve is dampened by a throttle when the pressure unloading valve is actuated to lengthen the reaction time of the compensating valve. As the telescopic cylinder travels from one stage to the next one momentarily pressure peaks occur of which the amplitudes increase with load pressure. To prevent actuating the compensating valve in such cases the reaction time of the compensating valve should be long enough such to not unload the compensating valve when the pressure unloading valve is actuated momentarily.

BRIEF DESCRIPTION OF THE DRAWING

Additional advantages and benefits of the present invention will become apparent upon reading of the description of the preferred embodiment taken in conjunction with the accompanying drawing which shows a schematic hydraulic diagram of a valve device.

DETAILED DESCRIPTION

A pump 1 of constant delivery volume delivers fluid through a pump pressure line 2 to a pressure compensating valve 3 and to a multi-stage telescopic cylinder 4 via a directional control valve 5. The directional control valve is a proportional solenoid valve controlled by pneumatic control pressure. The directional control valve is shown in the neutral position. By supplying control pressure to the port "a" it is adjusted towards "lowering" and by applying control pressure to the port "b" it is adjusted towards "lifting". In the position "lifting" the pressurized fluid passes first through an adjusting throttle 7 in the pump pressure line 2, then the throttling area 8 of the directional control valve (spool opening area) then a load holding valve 9 and from there via the port A to the cylinder 4. In the position "lifting" the load pressure present downstream of the throttling area 8 is supplied to the control conduit 10 in which the load pressure thus prevails.

In the neutral position of the valve 5 the control conduit 10 is connected to a conduit 12 leading to the reservoir. The same applies for the position "lowering" in which the fluid displaced from the cylinder 4 flows to the conduit 12 and the control conduit 10 is connected alike to the conduit 12. As it is conventional the control conduit 10 is connected to a control line 15 leading to the compensating valve 3 via a shuttle valve 14 such that the highest load pressure selected by the shuttle valve 14 is supplied to the control conduit 15. For example the load pressure sensed at the directional control valve 5 or the load pressure sensed at a further valve not shown may be the highest load pressure.

The piston of the pressure compensated valve is urged towards opening by the pump pressure in the signal conduit 16 and towards closing by a spring 17 and the pressure in the control conduit 15. A throttle 20 is provided in the control conduit 15. Furthermore a pressure limiting valve 21 is provided between the reservoir conduit 12 and a connection between the throttle 20 and the compensating valve 3.

The operation is as follows: In the neutral position of the directional control valve 5 the control conduit 15 connected to the pressure compensated valve 3 is vented via the directional control valve to the reservoir conduit 12 so that the fluid volume delivered by the pump 1 as a function of the speed thereof is returned against low resistance to the reservoir through the pressure compensated valve 3 now open.

In the position of the valve 5 "lifting" the stroke of the valve spool, or respectively the opening area of the measuring throttle 8 which increases with a increasing control pressure at port "b" determines the speed of the telescopic cylinder. The pressure compensated valve 3 maintains the pressure drop across the throttling area 8 constant so that the fluid volume delivered to the telescopic cylinder 4 is a function of the opening area at the directional control valve only, i.e. the volume is independent from the load pressure and the speed of the pump 1. The residual volume at load pressure is returned to the reservoir through the valve 3. By providing the adjustable throttle 7 in the pump pressure line 2 the maximum fluid volume and thus the maximum speed may be limited.

The control conduit 15 is connected through a two position two port valve 22 to the reservoir conduit 12. This pressure unloading valve 22 is engaged by the load pressure at the port A and in opposition thereto by an adjustable spring 23. When the load pressure equals the force adjusted by the spring 23 the valve 22 is actuated to connect the control conduit 15 to the reservoir. The pressure compensated valve 3 opens and the pump 1 delivers the total volume against low resistance to the reservoir. The load is then held by the load holding valve 9 which is built in the valve 5 so that the pressure in the telescopic cylinder 4 is maintained.

The throttle 20 provides for a dampening so that the compensating valve 3 does not open when the pressure peaks above referred to occur in the telescopic cylinder 4 which peaks result in a momentary opening of the pressure unloading valve 22. Accordingly the pressure unloading valve must be actuated for a predetermined minimum time until the pressure compensated valve 3 may be opened. For safety a pressure limiting valve 21 is additionally provided in the control conduit 15.

In the position of the valve 5 "lowering" the load port A is connected to the reservoir. By the proportional control of the valve 5 a load responsive lowering speed is selected. Furthermore the control conduit 15 is connected to the reservoir in this valve position. The valve 3 is thus opened so that the fluid volume delivered by the pump during lowering is returned pressureless to the reservoir.

I claim:

1. A valve device for operating a telescopic cylinder of a tipper truck from a system comprised of a pressure pump and a reservoir, said valve device comprising a directional control valve including a throttling area, a pressure line extending from said pump to said directional control valve, a cylinder line for said cylinder, said directional control valve being selectively operable between a lifting position for connecting said cylinder line to said pressure line and a lowering position for connecting a control conduit to said reservoir, a pressure compensating valve connecting said pressure line, between said pump and said directional control valve, to said reservoir for maintaining a constant pressure difference between said pressure line and said control conduit, a load holding valve downstream of the throttling area for precluding flow from said cylinder line to maintain a holding pressure in said cylinder, said control conduit being connected to a port between the throttling area and said load holding valve when said directional control valve is in the lifting position, and a pressure unloading valve responsive to the pressure in said cylinder line for connecting said control conduit to said reservoir when the pressure in said cylinder line exceeds a predetermined value for returning fluid pumped by said pump to said reservoir when said cylinder is maintained in position by said load holding valve.

2. The valve device of claim 1 wherein the control conduit is connected to the reservoir in a neutral position of the directional control valve.

3. The valve device of claim 1 wherein the pressure unloading valve is a two port/two position valve operated by the pressure in the cylinder line.

4. The valve device of claim 1 wherein a throttle is provided in the control conduit between the pressure compensating valve and said pressure unloading valve.

5. The valve device of claim 1 wherein a pressure limiting valve is provided in the control conduit between the pressure compensating valve and the reservoir.

6. The valve device of claim 1 wherein an adjustable throttle is provided in the pressure line upstream of said directional control valve.

* * * * *